3,308,066
PAINT STRIPPING COMPOSITION AND METHOD
Donald P. Murphy, Roseville, and George L. Tupper, St. Clair Shores, Mich., assignors to Hooker Chemical Corporation, Niagara Falls, N.Y., a corporation of New York
No Drawing. Filed July 27, 1964, Ser. No. 385,457
12 Claims. (Cl. 252—158)

This invention relates to a composition and method for removing protective coatings from surfaces, and more particularly relates to a novel additive for increasing the effectiveness of alkaline stripping compositions.

In the manufacture of various commercial articles, it is often the practice to provide such articles with a protective and/or decorative coating on the surface. The coatings applied include paints, varnishes, lacquers, and the like, and are formulated from numerous and diverse ingredients, including acrylic resins, epoxy resins, vinyl resins, alkyd resins, and the like.

In the course of manufacturing these commercial articles, it sometimes happens that some of the articles fail to meet the manufacturing specifications because of some defect in the protective and/or decorative coatings which are applied. When this happens, it is desirable to remove the defective coating, e.g., paint, from the article so that it may be re-coated, rather than discarded or sold as a "second," with the resulting financial loss. In recent years, however, great improvement have been made in both the durability and adhesion of paints and similar protective coatings so that their removal from a surface after they have been applied, cured and/or dried, has become increasingly difficult. These difficulties have been encountered particularly when using chemical means to effect the removal of the coatings, such chemical removal methods generally being preferred because they tend to eliminate costly hand operations and are readily adapted to a continuous process.

Not only is it desirable to remove the paint from articles on which the coating is defective but, additionally, where the articles being coated are transported on a conveyor line, the hooks which support the article also become coated with the paint during the process. Since these hooks or hangers are repeatedly introduced into the painting zone of the process the paint continues to build up on them, adding weight to the conveyor line and often filling in the hook, if it is not periodically stripped off or removed. Accordingly, it is desirable to be able to remove such protective coatings from such hooks or hangers, as well as from defective articles, quickly and completely, and preferably by using chemical means.

In the past, considerable use has been made of alkaline stripping compositions in which the articles from which the protective coating is to be removed are immersed for a period of time sufficient to effect a substantial loosening of the coatings. With the advent of improved paint systems, such as the acrylic paints and lacquers, difficulties have often been encountered with such alkaline stripping compositions. Frequently, it had been found that the articles must be immersed in a boiling alkaline stripping composition for several hours in order to obtain the desired loosening of the protective coating and in some instances even longer contact times have not resulted in an appreciable loosening of the coating.

It is, therefore, an object of the present invention to provide an improved alkaline stripping composition which is effective in removing various protective coatings, such as paint and the like, from surfaces to which they have been applied.

Another object of the present invention is to provide an improved alkaline stripping composition which is particularly effective in removing acrylic type coating materials in appreciably shorter periods of time than have heretofore been possible with alkaline stripping compositions.

A further object of the present invention is to provide an improved method for removing protective and/or decorative coatings from surfaces to which they have been applied, which methods are carried out in appreciably shorter periods of time than have heretofore been possible.

These and other objects will become apparent to those skilled in the art from the description of the invention which follows:

Pursuant to the above objects, the present invention includes an alkaline composition useful in removing protective films which comprises an alkali metal hydroxide as the principal source of alkalinity and an accelerating amount of tripropylene glycol. Broadly, the present composition includes both an aqueous solution usable as a paint stripping material and an alkaline concentrate, which may or may not contain water which may be diluted with water to form the aqueous stripping solution of the desired concentration. The present invention also includes an alkaline composition adapted for use as a stripping composition when dissolved in water, which comprises a major amount of an alkali metal hydroxide, as the principal source of alkalinity, and an accelerating amount of tripropylene glycol. Such compositions, when dispersed in water, are found to give excellent results in removing or substantially loosening decorative and/or protective films, such as paints and the like, from metal surfaces to which they have been applied and are particularly effective in removing coating materials containing acrylic, epoxy, vinyl, and alkyd resin coating components, which materials have been heretofore removed, if at all, only with great difficulty by conventional alkaline paint strippers.

More specifically, the above alkaline composition of the present invention contains an alkali metal hydroxide, as the principal source of alkalinity, in an amount of at least about 50 percent by weight of the composition. Desirably, in this solid composition the alkali metal hydroxide is present in an amount within the range of about 70 to about 97 percent by weight of the composition.

In addition to the alkali metal hydroxide, the solid alkaline compositions which are dispersible in water to form the present paint stripping solutions, may also contain other alkaline materials. Such alkaline materials may include the alkali metal carbonates, alkali metal silicates, alkali metal phosphates, and the like. Exemplary of the alkali metal phosphates which may be included in the composition are trisodium phosphate, tetrasodium pyrophosphate, tetrapotassium pyrophosphate, sodium tripolyphosphate, and the like. Typically, these latter alkaline materials, i.e., the alkali metal silicates, alkali metal carbonates, and alkali metal phosphates, will be present in the alkaline composition in amounts up to about 50 percent by weight of the composition, with amounts within the range of about 3 to about 30 percent by weight of the composition being preferred. It is to be understood that the foregoing amounts refer to the total of all alkaline materials other than the alkali metal hydroxides, which totals may be made up of only one of the added alkaline materials or a mixture of two or more of these materials. It is to be appreciated, of course, that as used in these specifications and claims, the term "alkali metal" is intended to refer to lithium, sodium, potassium, cesium, and rubidium. In many instances, the preferred alkali metal has been found to be sodium so that primary reference hereinafter will be made to the compounds of sodium. This is not, however, to be taken as a limitation of the present invention but merely as being exemplary thereof, since potassium hydroxide and alkaline potassium salts are also useful.

In addition to the alkaline materials indicated hereinabove, the solid alkaline compositions of the present invention may also include a gluconic acid material. Such material is typically present in the composition in an amount up to about 10 percent by weight of the composition, with amounts within the range of about 2 to about 7 percent by weight of the composition being preferred. It is to be understood that by the term "gluconic acid material" it is intended to refer to and include gluconic acid itself, water soluble and water dispersable forms of gluconic acid, such as the alkali metal gluconates, and in particular sodium gluconate, glucono-delta-lactone, and the like.

Surface active or wetting agents may also be included in the subject composition, typically in amounts up to about 10 percent by weight of the total composition with amounts within the range of about 0.1 to about 7 percent by weight being preferred. Various suitable surface active agents of the anionic, nonionic and cationic types may be used, provided they are soluble and effective in solutions having a high alkalinity. In many instances, excellent results have been obtained when using wetting or surface active agents of the phosphate ester type and, accordingly, these materials are preferred. Materials of this type are exemplified by QS–44 a product of the Rohm and Haas Company. Additionally, sulfonated fatty acid amide derivatives as described in U.S. Patents 2,773,068 and 2,528,378 may be used. Exemplary of these materials are Miranol JEM and Miranol $C_2M$ products of the Miranol Chemical Company.

As has been indicated hereinabove, the tripropylene glycol is present in the subject composition in an activating amount. If desired, it may be included in the solid alkaline composition or it may be added to the aqueous paint stripping solution which is formulated by dispersing or dissolving the alkaline composition in water. Inasmuch as it is desirable that the aqueous paint stripping formulation contains substantially no undissolved materials, it is preferable that the tripropylene glycol is not present in an amount which exceeds its solubility in the aqueous paint stripping solution, whether it is included in the solid alkaline composition from which the aqueous stripping solution is formulated or is added to the aqueous alkaline stripping solution. Typically, when the tripropylene glycol is included in the solid alkaline composition it is present in an amount within the range of about 1 to about 10 percent by weight of the total composition, with amounts within the range of about 2 to about 8 percent being preferred. Where the tripropylene glycol is added to the aqueous alkaline paint stripping solution, it is typically present in an amount within the range of about 1 to about 12 percent by volume of the paint stripping solution with amounts within the range of about 2 to about 7 percent by volume being preferred.

In formulating the aqueous alkaline paint stripping composition of the present invention, the solid alkaline compositions are dissolved in water in amounts sufficient to provide the desired alkalinity to effect substantial loosening of the paint film to which the composition is applied, but in amounts insufficient to exceed the maximum solubility of the tripropylene glycol in the solution. In this regard, it has been found that the solubility of the tripropylene glycol in the solution is inversely proportional to the alkalinity of the solution so that at lower alkalinities more tripropylene glycol can be dissolved in the solution. Typically, the aqueous alkaline paint stripping solution of the present invention will contain the solid alkaline composition in amounts within the range of about 0.5 to about 5 pounds per gallon of solution, with amounts within the range of about 1 to about 3 pounds per gallon being preferred. Where the tripropylene glycol has not been included in the solid alkaline composition from which the aqueous paint stripping solution is formulated, it will, of course, be added to the stripping solution in an amount indicated hereinabove. In its most preferred embodiment, the aqueous alkaline paint stripping solution contains the solid alkaline composition in an amount of about 2 pounds per gallon and the tripropylene glycol in an amount of about 2 percent by volume of the stripping solution.

In utilizing the stripping composition of the present invention, the aqueous alkaline stripping solution, formulated as has been indicated hereinabove, is brought into contact with the article from which it is desired to effect removal of paint or similar protective or decorative coating. The contact time needed to effect a substantial loosening of the paint from the surface will depend on the nature and thickness of the paint which is to be removed. With some paints, contact times of a few minutes, e.g., 2 to 3 minutes, may be sufficient, while with other and more difficulty removable paints, appreciably longer contact times, e.g., 30 minutes or more, may be desirable. Accordingly, it is not feasible to give specific contact times because times of contact will be those which will effect a substantial loosening of the paint on the surface. In this regard, it is to be noted that it is not essential that the stripping composition of the present invention remain in contact with the coated surface for a period of time sufficient to effect a complete removal of the coating from the surface but only for a time sufficient to effect a loosening of the paint film on the surface so that it may then be removed by brushing, high pressure water sprays, and the like. Generally, it is desirable that the contact between the subject stripping composition and the surface from which the coating is to be removed is effected by immersing the surface in the stripping solution. In this manner a thorough and continuous wetting of the surface film by the stripping solution is obtained, with little or no loss of the stripping solution. In some instances, however, particularly when the less difficultly removable films are to be treated which need shorter contact times, other contacting techniques such as spraying, flooding, or the like may be utilized.

Desirably, the paint stripping solution is at an elevated temperature when it is brought into contact with the surfaces from which the protective film is to be removed. Preferably, the solution is at a temperature which is close to its boiling point, with temperatures within the range of about 90 to about 100 degrees centigrade being typical. It will be appreciated, however, that in some instances higher or lower temperatures, e.g., room temperature, may also be used.

After the substantial loosening of the protective film on the surfaces being treated has been effected, and the film has been removed from the surface, either by retaining this surface in the stripping solution until removal is complete or by utilizing other removal techniques on the loosely adhering film, such as brushing, high pressure sprays, and the like, the surface is in a condition to be recoated with a new protective film. Generally, it is preferred that the surface be rinsed so as to remove any of the alkaline stripping solution which may be retained on the surface, prior to again subjecting the surface to the coating operation. It has been found that by using the aqueous alkaline stripping solution described above, in the manner which has been indicated, greatly improved results are obtained in terms of reduction in the time required to effect a substantial loosening of many different types of protective film, as compared to the results which are obtained when stripping solutions are used which either do not contain tripropylene glycol or which contain another accelerating additive, such as the commonly used cresylic acid.

So that those skilled in the art may better understand the present invention and the manner in which it may be practiced, the following examples are given. It is to be appreciated, however, that these examples are only exemplary of the compositions and processes of the present invention which may be used and are not to be taken as limiting the invention. In these examples, unless otherwise indicated, the temperatures are expressed in degrees centigrade and parts are by weight.

In the following examples, the paints to be removed were applied to 4 inch by 6 inch steel panels which had previously been coated with a convential zinc phosphate paint base coating. Unless otherwise indicated, the thickness of the paint on these panels was about 1 mil. (1/1000 inch). The painted panels were then immersed in the various stripping solutions to be tested and retained therein until there was a substantially complete removal of the paint film from the panel. The stripping solutions were maintained at the boiling point, i.e., about 100 degrees centigrade during the time the panels were immersed therein. In formulating the aqueous stripping solutions, the following solid alkaline compositions were used:

| (A) | Percent |
|---|---|
| Sodium hydroxide | 93.5 |
| Sodium gluconate | 5.5 |
| Phosphate ester wetting agent | 1.0 |

| (B) | Percent |
|---|---|
| Sodium hydroxide | 65 |
| Trisodium phosphate | 10 |
| Tetrapotassium pyrophosphate | 10 |
| Sodium gluconate | 10 |
| Phosphate ester wetting agent | 5 |

| (C) | Percent |
|---|---|
| Sodium hydroxide | 70 |
| Sodium carbonate | 19 |
| Sodium gluconate | 5 |
| Tripropylene glycol | 5 |
| Phosphate ester wetting agent | 1 |

When compositions A and B are used to formulate the stripping solution, the tripropylene glycol was added to the solution in the amounts indicated. When composition C was used, it included the tripropylene glycol therein.

For convenience hereinafter, the tripropylene glycol will be referred to as TPG. Using the procedure as has been set forth hereinabove, the following results were obtained:

ene glycol. A hook from a conveyor line, coated with 158 mils of an acrylic ester paint, was immersed in the solution which was maintained at a temperature of about 100 degrees centigrade. After an immersion time of about 40 hours, the paint was completely removed from the hook. In contrast, a similar hook also coated with 158 mils of the acrylic paint required an immersion time of about 168 hours in a similar stripping solution, but without the tripropylene glycol, to remove the paint.

The procedure of the preceding examples was repeated using solutions formulated from alkali metal compounds other than sodium compounds, including potassium hydroxide and potassium carbonate and using Miranol JEM and Miranol $C_2M$ as the wetting agent.

From the above results, it is seen that the alkaline paint stripping compositions of the present invention in which there is incorporated an accelerating amount of tripropylene glycol give an appreciable reduction in the time required to effect removal of protective paint films from various metallic surfaces, as compared to compositions which do not contain the tripropylene glycol and those which contain cresylic acid as the accelerator instead of the tripropylene glycol. Not only is the time for effecting the removal of the paints substantially reduced when using the present compositions containing tripropylene glycol, but in many instances, compositions without tripropylene glycol are found to have substantially no effect in the removing or even loosening the paint film even after they have been in contact with the film for two to three times as long as the present compositions.

While there has been described various embodiments of the invention, the compositions and methods described are not intended to be understood as limiting the scope of the invention as changes therein are possible and it is intended that each element recited in any of the following claims is to be understood as referring to all equivalent elements for accomplishing substantially the same results in substantially the same manner, it being intended to cover the invention broadly in whatever form its principle may be utilized.

| Example | Solid Composition and amounts used in pounds/gallon | TPG used in percent by volume | Paint System | Time for complete removal in minutes |
|---|---|---|---|---|
| 1 | A, 2 | 2 | Acrylic Primer | 9. |
| 2 | A, 2 | None | do | No effect after 1 hour. |
| 3 | A, 2 | 2 | Acrylic Primer and Acrylic top coat | 27. |
| 4 | A, 2 | None | Same as 3 | No effect after 1 hour. |
| 5 | A, 2 | 2 | Acrylic | 23. |
| 6 | A, 2 | None | do | No effect after 1 hour. |
| 7 | A, 2 | 2 | do | 53. |
| 8 | A, 2 | None | do | No effect after 3 hours. |
| 9 | A, 2 | 2 | White vinyl | 10. |
| 10 | A, 2 | None | do | 40. |
| 11 | A, 2 | 2 | Epoxy primer | 5. |
| 12 | A, 2 | None | do | 25. |
| 13 | A, 2 | 2 | Epoxy primer and acrylic lacquer | 11. |
| 14 | A, 2 | None | Same as 13 | Only 70% could be peeled off after 6 hours. |
| 15 | A, 2 | 2 | Epoxy primer and melamine modified baked enamel (2.5 mils thick). | 3. |
| 16 | A, 2 | None | Same as 15 | 10–15. |
| 17 | A, 2 | 2 | Alkyd melamine | 1.5. |
| 18 | A, 2 | None | do | 3.5. |
| 19 | A, 2 | 2 | Acrylic | 8. |
| 20 | A, 2 | None | do | 50. |
| 21 | B, 2 | 3 | White vinyl | 10. |
| 22 | B, 2 | (¹) | do | No attack after 20 minutes. |
| 23 | B, 2 | 3 | Acrylic | 45. |
| 24 | B, 2 | (¹) | do | No attack after 1 hour. |
| 25 | C, 2 | (²) | Acrylic primer | 19. |
| 26 | C, 3 | (²) | do | 12. |
| 27 | A, 2 | 1 | do | 9. |
| 28 | A, 1.5 | 2 | White vinyl | 13. |
| 29 | A, 1.5 | 3 | do | 10. |
| 30 | A, 1 | 5 | Acrylic primer | 30. |
| 31 | A,³ 1 | 10 | do | 30. |

¹ 3% cresylic acid instead of TPG.
² TPG in solid composition.
³ With 5% by weight of phosphate ester wetting agent.

*Example 32*

The procedure of the preceding examples was repeated using a solution formulated with 2 pounds/gallon of composition A and containing 2 perecnt by volume tripropyl-

What is claimed is:

1. A composition useful when dissolved in water for removing paint films which consists essentially of a major amount of an alkali metal hydroxide and tripropylene glycol in an amount within the range of about 1 to about 10% by weight of the total composition.

2. The composition as claimed in claim 1 wherein the alkali metal hydroxide is present in an amount within the range of about 50 to about 97 percent by weight of the total composition and the tripropylene glycol is present in an amount within the range of about 1 to about 10 to about 10% by weight of the total composition.

3. The composition as claimed in claim 2 wherein there is also present in the composition an additional alkaline material selected from the group consisting of alkali metal carbonates, alkali metal silicates, and alkali metal phospates, which additional alkline material is present in an amount within the range of about 3 to about 50 percent by weight of the total composition.

4. The composition as claimed in claim 3 wherein there is also present a gluconic acid material selected from the group consisting of gluconic acid, alkali metal gluconates and glucono-delta-lactone in an amount within the range of about 1 to about 10 percent by weight of the total composition.

5. An aqueous paint removing composition which consists essentially of an alkali metal hydroxide in an amount within the range of about 0.5 to about 5 pounds per gallon and tripropylene glycol in an amount within the range of about 1 to about 12 percent by volume of the composition, the remainder of the composition being water.

6. An aqueous paint removing composition which consists essentially of water and an alkaline composition in an amount within the range of about 1 to about 5 pounds per gallon which alkaline composition consists essentially of about 50 to about 97 percent by weight of an alkali metal hydroxide, and from about 3 to about 50 percent by weight of an additional alkaline material selected from the group consisting of alkali metal, silicates, alkali metal carbonates, and alkali metal phosphates, and tripropylene glycol in an amount within the range of about 1 to about 12 percent by volume of the aqueous solution.

7. The aqueous paint stripping composition as claimed in claim 6 wherein the alkaline composition contains a gluconic acid material selected from the group consisting of gluconic acid, alkali metal gluconates and glucono-delta-lactone in an amount within the range of about 1 to about 10 percent by weight of the alkaline composition.

8. The aqueous paint stripping composition as claimed in claim 7, wherein the alkaline composition is present in an amount within the range of about 1 to about 3 pounds per gallon and the tripropylene glycol is present in an amount within the range of about 2 to about 5 percent by volume of the total solution.

9. A method of removing paint and similar protective films from the surface of an article which comprises contacting the article from which the film is to be removed with the aqueous alkaline paint stripping solution as claimed in claim 5 and maintaining the solution in contact with the surface for a period of time to effect a substantial loosening of the paint on the surface.

10. A method of removing paint and similar protective films from a surface which comprises contacting the surface from which the film is to be removed with the aqueous alkaline paint stripping solution as claimed in claim 6 and maintaining this solution in contact with the surface for a period of time sufficient to effect a substantial loosening of the film on the surface.

11. A method of removing paint and similar protective films from a surface which comprises contacting the surface from which the film is to be removed with the aqueous alkaline paint stripping solution as claimed in claim 7 and maintaining the solution in contact with the surface for period of time sufficient to effect a substantial loosening of the film on the surface.

12. A method of removing paint and similar protective films from a surface which comprises contacting the surface from which the film is to be removed with the aqueous alkaline paint stripping solution as claimed in claim 8 and maintaining the solution in contact with the surface for a period of time sufficient to effect a substantial loosening of the film on the surface.

References Cited by the Examiner

UNITED STATES PATENTS

| | | | |
|---|---|---|---|
| 1,449,388 | 3/1923 | Ferrell | 252—156 X |
| 1,657,147 | 1/1928 | Brainard | 252—156 X |
| 2,662,837 | 12/1953 | Duncan | 252—158 X |
| 2,962,395 | 11/1960 | Brown | 252—156 X |

LEON D. ROSDOL, *Primary Examiner.*

ALBERT T. MEYERS, *Examiner.*

J. T. FEDIGAN, *Assistant Examiner.*